United States Patent [19]

McAnally

[11] Patent Number: 5,190,072
[45] Date of Patent: Mar. 2, 1993

[54] RELIEF VALVE ASSEMBLY FOR RECYCLABLE PRESSURE VESSELS

[75] Inventor: Milton B. McAnally, Charlotte, N.C.

[73] Assignee: Schrader Automotive Inc., Charlotte, N.C.

[21] Appl. No.: 889,191

[22] Filed: May 28, 1992

[51] Int. Cl.⁵ .......................................... F16K 17/196
[52] U.S. Cl. .............................. 137/454.5; 137/543.13; 137/587; 251/904
[58] Field of Search ............... 137/454.5, 454.2, 542, 137/543.13, 587; 251/904

[56] References Cited

U.S. PATENT DOCUMENTS

| | | | |
|---|---|---|---|
| 3,158,351 | 11/1964 | Kauffman et al. | 137/454.5 X |
| 3,918,482 | 11/1975 | Stroh | 137/542 |
| 4,413,804 | 11/1983 | Lanins et al. | 251/904 X |
| 4,425,935 | 1/1984 | Gonzalez | 251/904 X |

FOREIGN PATENT DOCUMENTS

| | | | |
|---|---|---|---|
| 247029 | 10/1960 | Australia | 137/587 |
| 2510059 | 9/1975 | Fed. Rep. of Germany | 137/587 |

*Primary Examiner*—Stephen M. Hepperle
*Attorney, Agent, or Firm*—Dallett Hoopes

[57] ABSTRACT

A tubular insert is adapted to be secured into an opening in the vessel and is formed with an internally threaded section adapted to receive a closure. The closure is a subassembly which includes a core housing having a threaded section threadedly engaging the insert and an internal threaded section and formed with a valve seat at its lower end. A core body is threadedly disposed in the housing and a valve element engages the seat with a compression spring inbetween the body and valve element. A stop is provided on the insert and retaining means are provided on the housing so that when the core housing is unscrewed, it is loosely retained in the insert indicating to everyone that the vessel is depressurized and the metal of the vessel can be heated and melted without any fear of explosion.

9 Claims, 2 Drawing Sheets

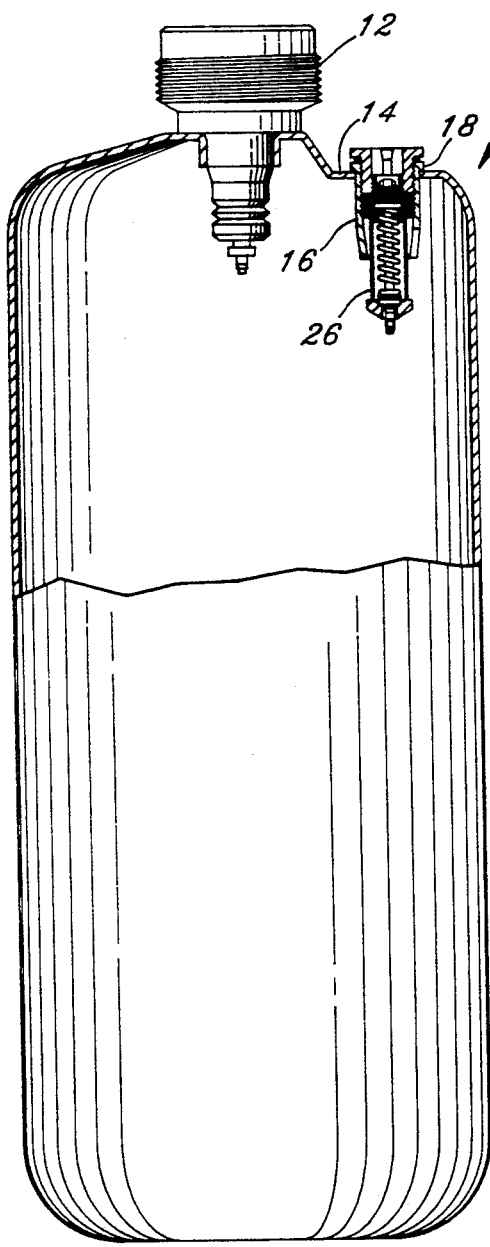
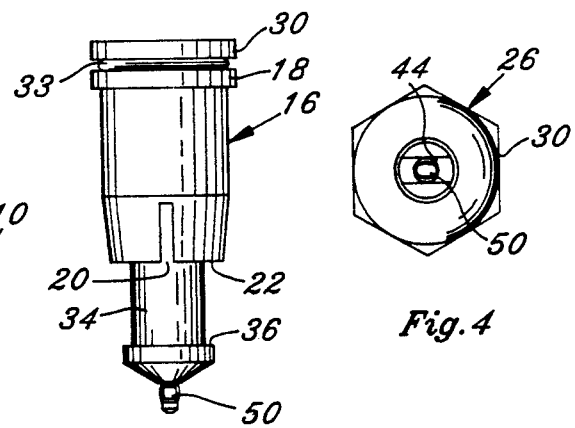
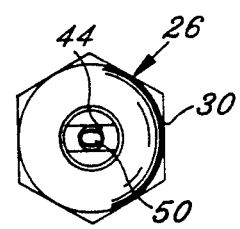
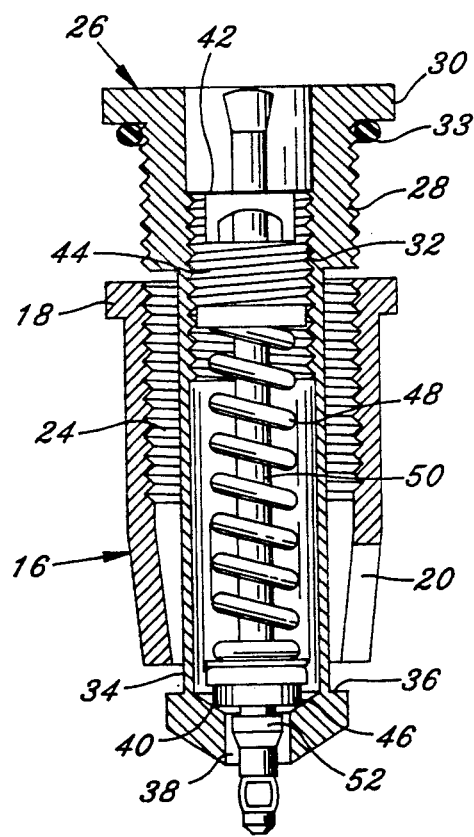
Fig.1
Fig.2
Fig.4
Fig.3

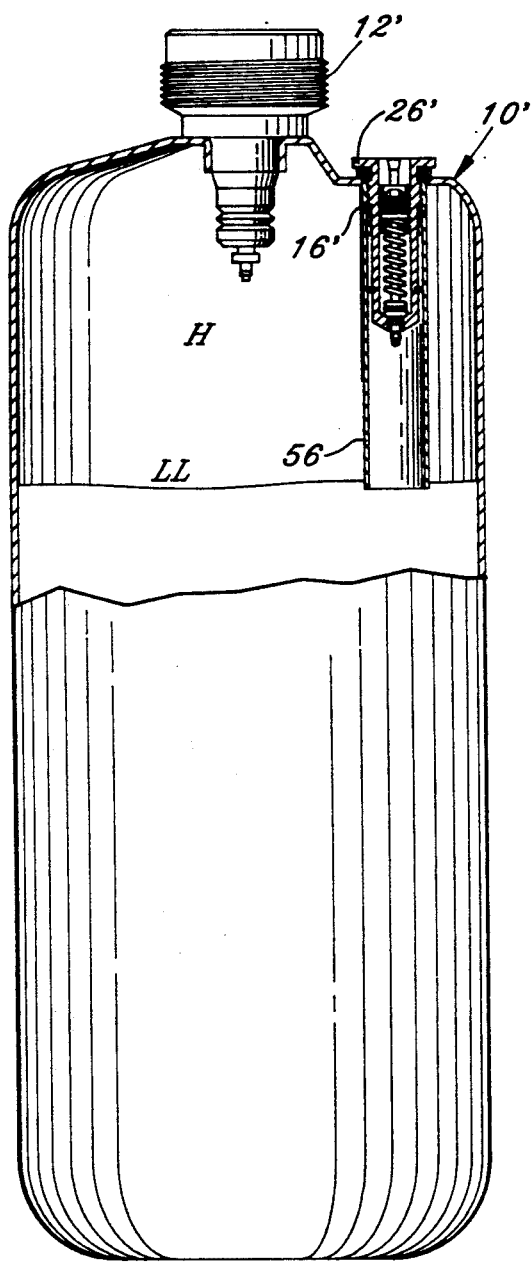
Fig.5
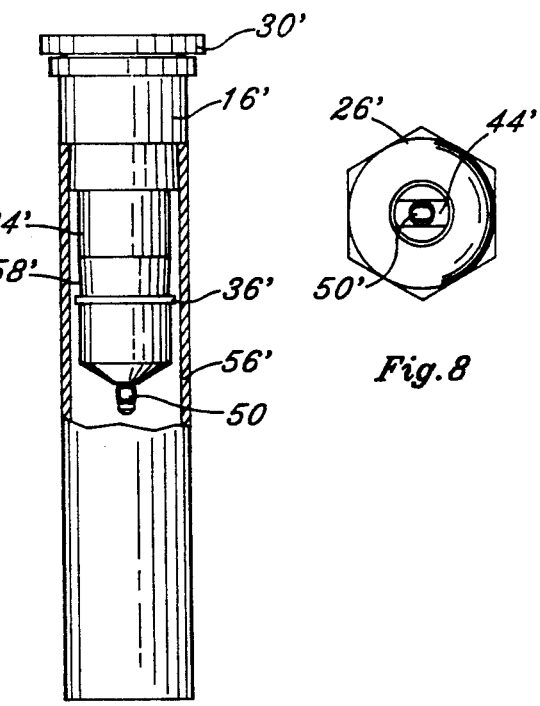
Fig.6
Fig.8
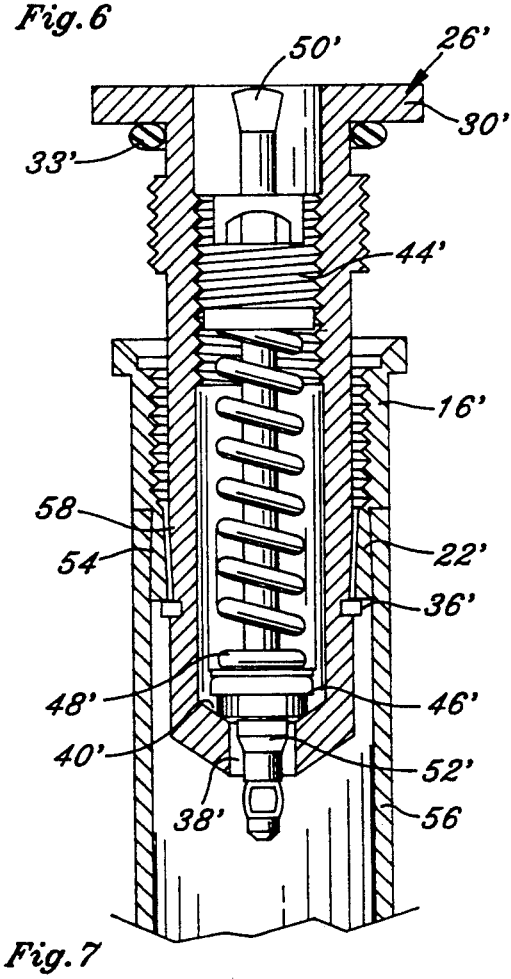
Fig.7

RELIEF VALVE ASSEMBLY FOR RECYCLABLE PRESSURE VESSELS

BACKGROUND OF THE INVENTION

1. Field of the Invention

This invention relates to a relief valve suitable for use in pressure vessels such as portable propane tanks. It is especially suited to tanks that are recyclable; that is, either recycled as scrap metal or returned for refilling.

The invention provides for the venting of the vessel and the disengagement of the relief valve subassembly so that the subassembly is loosely retained in its insert. This signals visually that the vessel is in vented condition and not dangerous to heat and melt down in metal recycling. The invention also involves such an assembly wherein the relief valve setting need not be distrurbed when the valve subassembly is disengaged to its venting condition or restored to operating condition in refilling.

2. Description of Related Art including Information Disclosed under §§1.97 to 1.99

In the prior art it is quite common for a portable propane tank to be provided with a spring-pressed relief valve so that should the pressure in the vessel rise, as when the vessel is subjected to inordinately high temperature, a relief valve pops off. An example of the structure of such valves is shown in the old U.S. Pat. No. 3,018,914 to M. E. Webster issued Jan. 30, 1962. Another example is shown in the U.S. Pat. No. 3,918,482 which issued Nov. 11, 1975 to William S. Stroh and assigned to my assignee.

Safety requires that relief valves be part of portable pressure tanks. Without such a relief valve the tank could explode, injuring persons and damaging property.

Briefly, such valves include an insert secured in the wall of the vessel, the insert being internally threaded. A relief valve core, similar to an ordinary tire valve core but having a spring between the valve core body and the valve element is screwed into the insert so that the element occludes a valve seat at the bottom of the insert. The setting of such a valve is determined by the position of the valve core body in the insert, the more downward the position, the more compression on the spring and the more pressure on the valve element against the seat. The greater the pressure on the seat, of course, the greater will be the pop-off pressure.

The pressure tanks with which the above-described relief valves are used are almost invariably of metal. Because they are manufactured by the millions and are "throw-aways", disposal of the empties presents a problem. The metal waste and litter has prompted an outcry of envioronmentalists demanding that the tanks be recycled.

The feasibility of recycling such vessels has been considered, but on the downside has been the hazard of possible explosion when the metal is recycled and the time-consuming reset when the tank is refilled so as to assure the proper relief pressure after refill. There is a need, therefore, for a relief valve for such pressure vessels which can readily be opened up upon the venting of the vessel and indicate its "safe" condition to the casual observer. At the same time, there is a need for such a vlave with the characteristics described above and which need not be reset upon reinstallation in the vessel during refilling. The call, in other words, is for a relief valve which can be removed to assure a depressurized vessel and reinstalled with no need for resetting the pop-off pressure.

SUMMARY OF THE INVENTION

The invention, therefore, is a tubular insert adapted to be secured into an opening in the vessel and formed with an internally threaded section adapted to receive a closure. The closure includes a core housing having a threaded section threaddedly engaging the insert and an internal threaded section. The housing is formed with a valve opening and seat at its lower end. A core is disposed in the housing and includes a threaded body engaging the threads in the housing, a valve element normally engaging the seat and a compression spring inbetween the body and valve element. A stop is provided on the insert and retaining means are provided on the housing so that when the housing is unscrewed, it is loosely retained in the insert indicating that the vessel is depressurized.

BRIEF DESCRIPTION OF THE DRAWINGS

Further features and objects of the invention will be apparent from the following specification and the drawings, all of which show non-limiting embodiments of the invention. In the drawings:

FIG. 1 is a sectional view through a vessel equipped with a relief valve assembly embodying the invention, the assembly being in section;

FIG. 2 is an enlarged elevational view of the assembly in closed condition;

FIG. 3 is a sectional view taken along the center line and showing the assembly in open condition;

FIG. 4 is a top plan view of the assembly;

FIG. 5 shows a modified form of assembly installed in a pressure vessel and in closed condition, the vessel being shown in sectional view and the assembly being shown in sectional view;

FIG. 6 is an enlarged view of the FIG. 5 modification of assembly and showing a dip tube connected thereto partly in section;

FIG. 7 shows the FIGS. 5, 6 modification in open condition and in section; and

FIG. 8 is a top plan view of the modification in FIG. 7.

DESCRIPTION OF THE PREFERRED EMBODIMENT

A vessel equipped with the relief valve assembly of the invention is shown in FIG. 1 and generally designated 10. It is provided with the conventional fill discharge fitting 12 and includes a top wall portion 14. The top wall portion 14 is apertured and receives a tubular insert 16. As shown in FIG. 2, the tubular insert 16 has a flange 18 about its upper end and this butts against the top wall portion. The insert is secured in the aperture as by solder, welding or the like.

The insert 16 is longitudinally slotted as at 20 and the segments between the slots are inclined inward (FIG. 3). The bottom end of the segments comprise stop means 22. Internally the insert 16 is provided with a threaded section 24.

A subassembly, or closure, comprises a housing 26 which is provided at its upper end with a threaded exterior as at 28 and an outward flange 30 about the upper end thereof. The flange 30 is formed with flats for engagement by a wrench. Like the insert, the housing is also tubular. The housing is provided with a threaded internal section 32, above which is an O-ring 33. Under section 32 the outer diameter of the housing is reduced in a reduced section 34. At the lower end of the reduced section the housing is enlarged to present an upwardly facing shoulder 36. A central vent opening 38 is provided in the bottom wall of the housing and a seat 40 is provided at the juncture of the vent 38 and the upper surface of the bottom wall as shown.

A relief valve core 42 is installed in the housing and comprises part of the subassembly. The core is similar or identical to the core shown in U.S. Pat. No. 3,918,482 referred to above. It comprises an externally threaded core body 44 which is tubular and has a transverse bridge and is threadedly received in the section 32 of the housing, and a valve element 46. A compression spring 48 is disposed between the body 44 and the valve element 46 and urges the valve element 46 downward against its seat 40 to close off the vent 38. The valve element may comprise the washer and cup as well as the valve, all as described in U.S. Pat. No. 3,918,482. A valve stem 50 may be provided and is secured at its lower end to the valve element 46 and passes through the bridge in the hollow body 44 as shown. The usual guide ferrule 52 is mounted on the valve stem 50 beneath the valve element.

The use of the structure thus far described is as conventional during the first use of the vessel. The subassembly including the housing 26 and core 42 are screwed (as by wrench engaging the flats on flange 30) into the insert installed in the vessel so that the O-ring 33 is compressed between the flanges 18 and 30 sealing the connection between the housing and the insert. The core body 44 is set in its housing at a position in which the compression spring 48 urges the valve element 46 against the seat 40 with the desired force to result in the proper relief pressure.

The vessel or tank 10 is filled through the conventional fitting 12 with liquified propane, for instance, and the entire unit is introduced to commerce. After the user has exhausted the supply of gas within the tank, he can turn the vessel in for recycling.

Preferably, at the recycle receiving station an attendant unscrews the housing 26 from the insert 16 so that the housing assumes the position shown in FIG. 3. As shown, the housing, when it is unscrewed and disengaged from the threads of the insert, is held loosely in the insert by the abutment of the retaining shoulder 36 against the stop means 22 which holds the housing from complete separation from the insert. This disengagement allows any residual gas left in the empty tank to escape when the tank is stored or transported during the recycling process.

Thus, when the subassembly, or closure, is disengaged as shown in FIG. 3, there is easy passage for gas between the insert and the housing. This is facilitated by the slots 20 in the bottom of the insert of the preferred embodiment.

As can be imagined, the housing, with its core body and valve element still in the insert, rattles loosely in the insert and is, not only visibly but audibly indicative of the depressurized and safe condition of the vessel. Further, the subassembly cannot become lost or blown out of the vessel.

In the recycling of the metal of the tank, the recycler sees that the tank is depressurized as described and confidently handles the tank and casts it into the furnace for melt down with no possibility of its explosion.

In the refilling situation, when the refiller attaches the liquid petroleum supply head to the fitting 12, he will inject into the vessel 10 the appropriate measured amount of liquid to constitute the proper quantity for a filled vessel. Once the vessel is thus charged, the subassembly, including the housing 26, is again screwed into the insert 16 until the O-ring 33 is compressed between the flanges 18 and 30 sealing the unit. Because the core body 44 has not been disturbed, the valve is still set to the same relief pressure as it was originally. The procedure described saves the resetting of the core body 44 in the housing 26 and the consequent labor and time.

MODIFIED EMBODIMENT

The embodiment shown in FIGS. 5 through 8 is only slightly different from the embodiment of FIGS. 1 through 4 and it operates in the same fashion. For this reason the primed form of the same reference numerals used in FIGS. 1 through 4 are used to designate corresponding parts of the modified form of the invention.

The differences between the two embodiments may be noted as follows. The retaining means 36' of the modified form is in the form of a groove about the housing 26' which receives a C-ring, the upper surface of which provides retaining means. The slight inward taper of the inside of the insert assists in closing the C-ring when the housing is pushed into the insert. Thereafter the ring expands to its manufactured shape. The insert 16' has at its lower end the stop means 22' against which the retaining means 26' butts when the housing is loose (FIG. 7).

In addition, the outside surface of the insert 16' is reduced as at 54 and receives in telescoping fashion a dip tube 56. The dip tube is crimped or soldered onto the insert 16', or otherwise secured.

Thus, when the subassembly, or closure, is loose in the insert as shown in FIG. 7, there is easy passage for gas between the insert and the housing. This is facilitated by an inward taper as at 58 in the outer surface of the housing just above the groove into which the retaining ring fits to comprise the retaining means 36'.

As stated, the operation of the modified form of the invention is the same as the preferred version. In the metal recycling operation the loosenmess of the closure will be apparent and the metal recycle shop will be able to see that the tank is vented and will not explode. An extra feature is provided by the dip tube 56 which, shown in FIG. 5, can be used to control the amount of liquid which may be received into the vessel 10'. In refilling stations without the proper metering facilities, the filling attendant can attach the propane filling head to the fitting 12' with the housing 26' in the open condition, —that is, the FIG. 7 condition—and simply load liquified petroleum into the vessel until it overflows around the housing 26' and out of the insert 16'. This will leave sufficient head space in volume H (FIG. 5) so that there is no danger of over-filling. The liquid level LL is determined automatically in accordance with the pertinent laws of physics as slightly higher than the lower end of the dip tube 56.

It will be apparent to those skilled in the art that the assembly disclosed will be ideal for pressure valves of the type for which recycling is desired or necessary. The present assembly will indicate visually and audibly the open condition of the vessel telling that the vessel is safe to handle and transport. Thus, in the metal recycling operation the tank being so visually open to atmosphere can be roughly handled, crushed and thrown into the melting furnace without fear of explosion. Also, the present assembly in the refilling situation will not require a resetting of the relief pressure valve on reuse. This will be especially appreciated by the personnel involved in the refilling operation.

Variations in the invention are possible without departing from the spirit of the invention. Thus, while the invention has been shown in only two embodiments, it is not so limited but is of a scope defined by the following claim language which may be broadened by an extension of the right to exclude others from making or using the invention as is appropriate under the doctrine of equivalents.

What is claimed is:

1. For a recycleable pressure vessel a relief valve assembly comprising:
   a. a tubular insert adapted to be secured in an opening in the vessel, the lower end of the insert being formed with stop means, and an internally threaded section intermediate the ends of the insert,
   b. a closure subassembly including
      1. a tubular valve core housing having an externally threaded section threadedly engaging the threaded section of the insert, an internally threaded section and an internal relief valve seat at the lower end of the housing,
      2. retaining means associated with the outside of the housing and spaced from the threaded section of the housing at least the distance from the stop means to the upper end of the threads on the insert,
      3. a valve core disposed in the housing and including a threaded tubular body engaging the internally threaded section in the housing at a position to establish relief pressure, a valve element in the lower end of the housing engaging the seat, and a spring compressively disposed between the body and the valve element,
   whereby after depressurizing the vessel, the closure subassembly may be unscrewed from the insert and the subassembly will be retained loosely in the insert as the stop means engages the retaining means, the insert and housing providing a vent path therebetween, all without disturbing the position of the valve core body in the housing and the relief pressure of the valve element against its seat.

2. An assembly as claimed in claim 1 wherein the stop means comprises inwardly sloping walls terminating in an annular end abutment.

3. An assembly as claimed in claim 1 wherein the retaining means is an enlargement at the lower end of the core housing providing an upward shoulder at its upper end adapted to engage the stop means.

4. An assembly as claimed in claim 1 wherein the retaining means is a peripheral groove in the housing and a retaining ring disposed in the groove to present an upward shoulder adapted to engage the stop means.

5. An assembly as claimed in claim 1 wherein the upper end of the core housing is provided with an outward flange offering wrench-engagable flats.

6. An assembly as claimed in claim 5 wherein an O-ring seal is provided between the flange and the insert for effecting a seal between the housing and the insert.

7. An assembly as claimed in claim 1 wherein the core body has an apertured bridge thereacross and a valve stem extends through the aperture and is secured to the valve element.

8. An assembly as claimed in claim 1 wherein a dip tube has its upper end secured about the insert and extends down below the lower end of the housing.

9. For a recycleable pressure vessel having a relief valve assembly comprising:
   a. a pressure vessel having discharge means and an opening separate from the discharge means,
   b. a tubular insert adapted secured in the opening, the lower end of the insert being formed with stop means, and an internally threaded section intermediate the ends of the insert,
   c. a closure subassembly including
      1. a tubular housing having an externally threaded section threadedly engaging the threaded section of the insert, an internally threaded section and an internal relief valve seat at the lower end of the housing,
      2. retaining means associated with the outside of the housing and spaced from the threaded section of the housing at least the distance from the stop means to the upper end of the threads on the insert,
      3. a valve core disposed in the housing and including a threaded tubular body engaging the internally threaded section in the housing at a position to establish relief pressure, a valve element in the lower end of the housing engaging the seat, and a spring compressively disposed between the body and the valve element,
   whereby after depressurizing the vessel, the closure subassembly may be unscrewed from the insert and the subassembly will be retained loosely in the insert as the stop means engages the retaining means, the insert and housing providing a vent path therebetween, all without disturbing the position of the valve core body in the housing and the relief pressure of the valve element against its seat.

* * * * *